United States Patent [19]
Guerra et al.

[11] Patent Number: 5,339,562
[45] Date of Patent: Aug. 23, 1994

[54] POINTLESS RELEASABLE FISH HOOK

[76] Inventors: Ricardo Guerra, 4455 N. Newcastle, Hardwood Heights, Ill. 60656; Alfred Salazar, 17406 S. 92 E. Ave., Bixby, Okla. 74008

[21] Appl. No.: 57,464

[22] Filed: May 6, 1993

[51] Int. Cl.⁵ .............................................. A01K 83/00
[52] U.S. Cl. ........................................ 43/43.16; 43/37
[58] Field of Search ................... 43/43.16, 43.2, 44.2, 43/44.6, 34, 35, 36, 37

[56] References Cited

U.S. PATENT DOCUMENTS

| | | | |
|---|---|---|---|
| 280,610 | 7/1883 | Greer | 43/37 |
| 1,507,344 | 9/1924 | Doering | 43/34 |
| 1,604,725 | 10/1926 | Sprangel | 43/37 |
| 3,214,859 | 11/1965 | Watkins | 43/43.16 |
| 3,397,477 | 8/1968 | Hand | 43/34 |
| 4,177,596 | 12/1979 | Dillon | 43/36 |

*Primary Examiner*—Paula A. Bradley
*Assistant Examiner*—Chuck Y. Mah
*Attorney, Agent, or Firm*—Veo Peoples, Jr.

[57] ABSTRACT

A fish catching device comprising a pointless non-piercing fish hook having a hinged lever that closes over the lure, driven by the biting force of the fish, is disclosed. The device closes and holds the fish by its mouth with a tongs-like action.

1 Claim, 2 Drawing Sheets

POINTLESS RELEASABLE FISH HOOK

BACKGROUND OF THE INVENTION

1. Field of the Invention.

This invention relates to fish hooks in general and more specifically to a non-piercing fishing device.

2. Description of the Prior Art.

Fish hooks are one of the oldest inventions made by man before the beginning of history.

For millenniums man has been improving fish hook designs, since they help to provide food on the table. Stronger materials allow sharpened points and barbs to improve the chances of a catch but disregard the well-being of the fish.

Since fishing has become more of a sport than a food providing activity, many sportsmen choose to keep only trophy size fish, while returning smaller fish to the water to avoid depletion of fisheries.

The trend of sportsmen toward catch and release has spurred the efforts of fish hook designers toward a reliable fish hook that causes less harm to the fish, which in turn improves the chances of survival of the released fish.

Examples of those efforts are "Fish Hooks with Retractable Barb" U.S. Pat. Nos. 3,624,690, 4,922,649, and many barbless fish hooks, disclosed in U.S. Pat. Nos. 4,858,371, 4,570,373, 4,028,838, and 4,723,372.

Conventional barbed hooks, retractable barb hooks or barbless hooks all work by the principle of piercing the flesh and cartilage of the fish's mouth.

Sometimes the fish completely swallows the bait and is gullet-hooked rather than lip-hooked. This condition complicates the removal of the hook and may produce a serious internal injury.

OBJECTS OF THE INVENTION

An object of the present invention is to provide a novel pointless non-piercing fish hook assembly.

Still another object of the present invention is to provide a fish hook that minimizes injury to the fish and improves the survivability of fish which are released or which escape.

Yet another object of the present invention is to provide a novel fish hook assembly which avoids injuries to the human body and which will be safe for use around children.

Additionally, the invention provides an easy-to-release fish hook, even in the water, thus reducing fish handling.

Further, the invention will reduce the possibility of a gullet-hooked fish.

Finally, the invention will provide a fish hook easy to manufacture and maintain.

SUMMARY OF THE INVENTION

The fish catching device of the present invention lacks any sharp points or barb which conventional fish hooks possess. These frequently produce a deep or perforating injury to either the fish or a human being.

According to the proposed invention, a fish catching device has been developed embodying a tongs-like-action fishing hook with relatively large surface jaws. The device inhibits perforation or deep penetration of the fish flesh but serves to securely catch and hold a biting fish by its mouth. The large surface jaws will result in a minimum amount of damage and harm to the fish.

The fish catching device of the present invention is intended to be used in combination with a retrievable fish line and a fishing rod or the like.

The fish catching device of the present invention generally includes an L-shaped body portion which comprises three sections. The first is a shank section which includes an opening that guides the fish line and serves as a receptacle for a locking plug. The locking plug locks a tongs-like hook closed with a fish until the fish is removed. The second section of the L-shaped body is an orifice located adjacent to the shank. A pivot pin in the orifice holds a double arm lever. The third section is a lure-jaw combination.

The double-arm lever mentioned above has three sections. The first is an end section which includes an orifice on each arm of the double-arm lever. Through those holes a double-arm connecting rod is installed, keeping both arms spaced apart and working in tandem.

The second is a middle section containing another orifice which is drilled into each arm of the lever to accommodate a pivot pin on which the double lever rotates.

The last section is a support for one end of a curvaceous jaw directed to the lure. The curvaceous shape and a highly textured surface of this jaw produce a strong gripping action on the lip of fish when clamped by a second opposing jaw.

Two small protrusions, one each side of the first section of the hook shank, keeps the double-arm lever in an open position until the lever is triggered closed by the force of a biting fish over the lure.

The fish catching device of the present invention operates in the following manner. When a fish bites the lure, it produces a pulling force over it and over the pivoting center of the double-arm lever which has one end attached to the fishing line. The movement produced by such force closes the lever's jaw in the direction of the lure-jaw, a tong-like action catches the fish lips between both jaws. A locking device on the fish line enters the opening on a lower hook when the hook closes, securing the fish until his release.

DETAILED DESCRIPTION OF THE INVENTION

Figure 1:
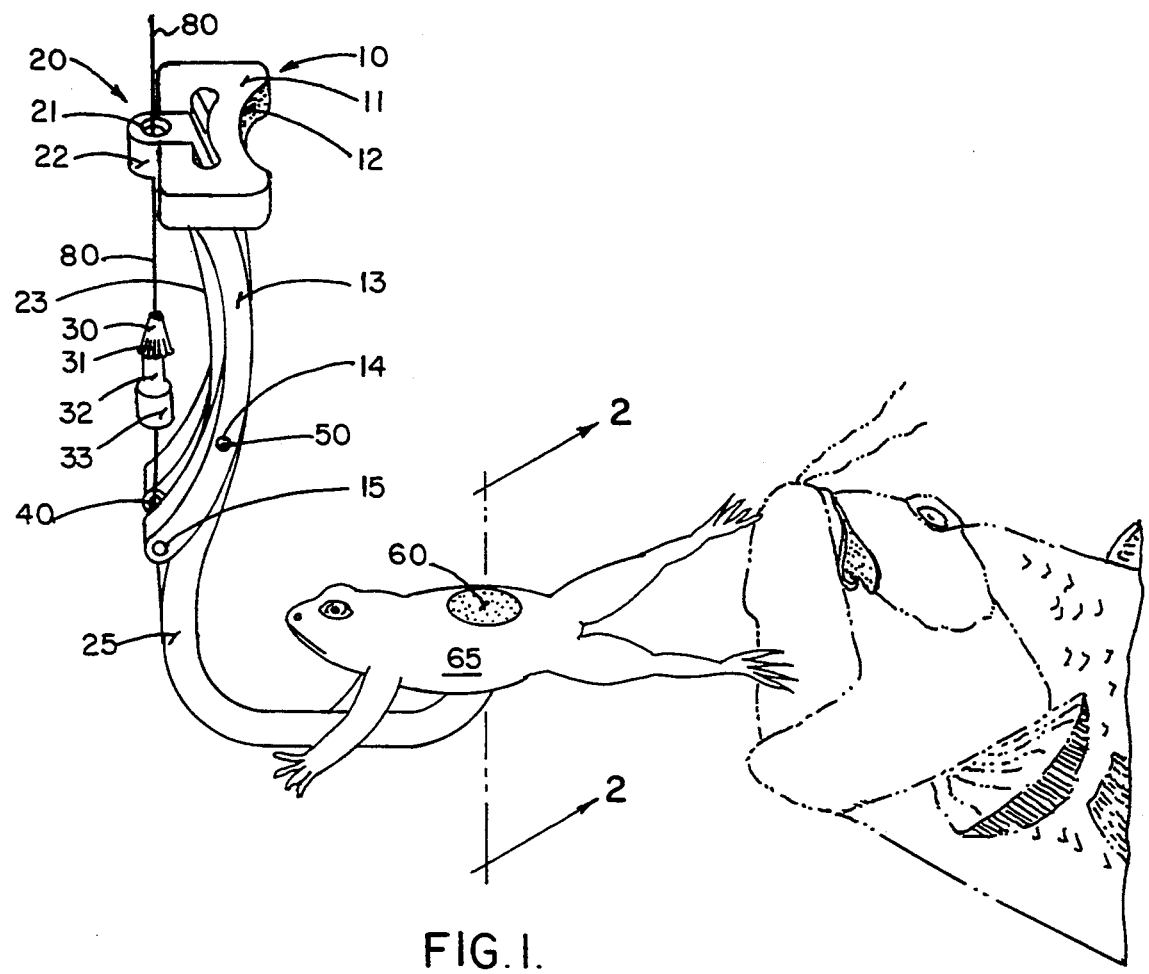
FIG. 1 is a perspective view of the fish catching device of the present invention in its open position with a rubber frog lure attached.
Figure 2:
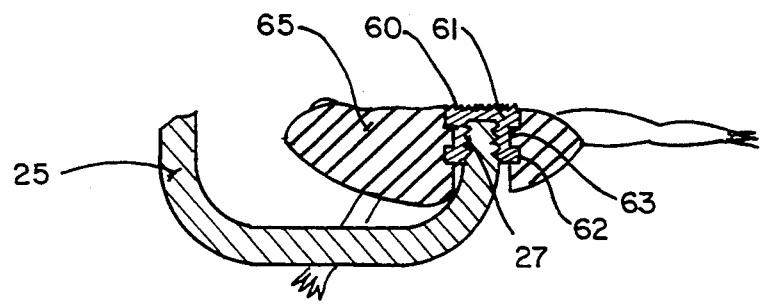
FIG. 2 is a sectional view taken at 2—2 of FIG. 1.
Figure 3:
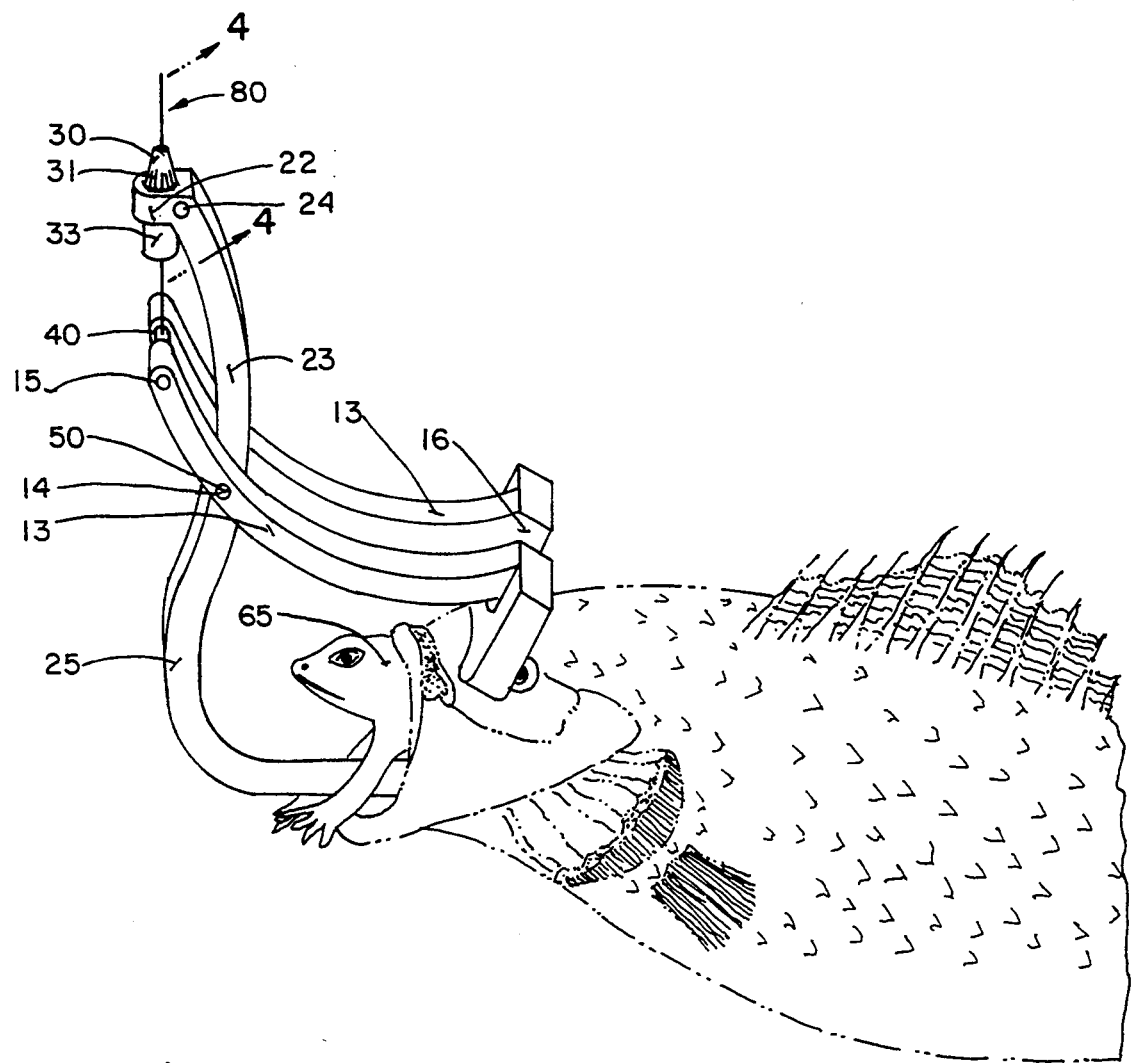
FIG. 3 is a perspective view of the same fish catching device of FIG. 1 in its closed position with a fish hooked on it.
Figure 4:
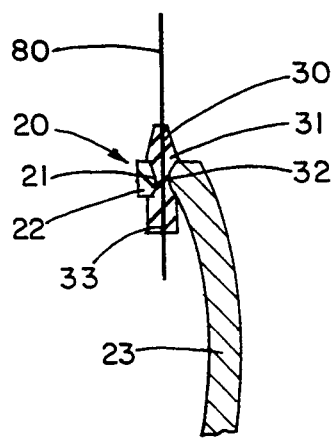
FIG. 4 is a sectional view of the locking plug in the opening when the hook is in its closed position (FIG. 3).

Turning now to the drawings, FIGS. 1, 2, and 3 show the various embodiments of the fish catching device of the present invention. This present disclosure is not intended to limit the broad aspects of the invention to the embodiments illustrated and is to be considered as an exemplification of the principles of the invention.

Referring to FIG. 1, a fish line or cable 80 passes freely through an opening 21 at the lower hook's 23 (seen more clearing at FIG. 3) proximate end and is attached to the proximate end 30 of the locking plug 30-33. Another cable is attached to the distal end 33 of the locking plug 30-33 and runs to the double-arm connecting rod 40. The double-arm connecting rod 40 secures both arms 13 of a double-arm lever 13. This rod 40 keeps both arms working in tandem and at sufficient distance from each other to avoid friction with the central section or shank 23 of the lower hook 25.

The double-arm lever 13 is attached in pivotal fashion to the central section or hook shank 23 by a pivot pin 50 that passes through an orifice 14 in each arm of the lever 13 and another orifice on the hook shank (not shown). This pivot pin 50 can have similar characteristics to an eyeglass screw and is the pivoting center of the double-arm lever 13.

An upper clamp 10, which is the load of the lever, is defined by a curvaceous shape at surfaces 11 and 12 to better follow the contours of a fish's anatomy and its surface 12 is highly textured to increase its gripping action, thus avoiding piercing of the fish flesh.

Both arms of the double-arm lever 13 and the upper clamp 10 can be formed from a single mold since they work as a single assemblage.

Two small nipples 24 (only one shown in FIG. 3) at each side of the proximate end 22 of lower hook 25 exert pressure over the innerside at end 16 of both arms of the lever 13 to secure the fish catching device in an open position (FIG. 1).

Referring to FIG. 1, when the fish catching device of the present invention is in the illustrated open position, the locking plug 30-33 is positioned between the opening 21 at the proximate end 20 of the lower hook 25 and the double lever arm connecting rod 40. The locking plug is driven into the opening 21 by the force of a biting fish.

The locking plug 30-33 can be made of resilient silicon rubber or other resilient composition. One preferred embodiment calls for the locking plug 30-33 to have four sections. First, it has a conical end 30 to ease its entry into the opening 21. The second section 31 extends toward the large end of the cone 30 and incorporates longitudinal grooves to receive silicon rubber, for purposes of tackiness, which may be introduced into the opening 21. The third section is a narrow constriction 32 extending from end 32 to the last section 33 which is a cylindrical stopcock to lock the plug 30-33 from advancing too far through opening 21. A textured surface may cover 33 to facilitate the release of the plug and fishing line 80 after landing the fish or releasing it to the water.

The lure 65 illustrated as a frog can have many different shapes or sizes and is embedded in the distal end 60 of the lower hook 25. The lower Jaw defined by 60-63 has internal threads 61 to allow an easy screw-type installation of lure 65 at the end 27 of the hook 25. (See FIG. 2.) A groove 63 curved into sidewall 62 of surface end 60 aids in securing the lure 65 attached to end 27. The surface 60 of this end Jaw 27 has a bigger diameter than the lower hook section 25 and is attached to 25 to avoid penetration of the fish's flesh. However, the highly textured surface 60 provides a strong gripping action when it is opposed by the double-arm lever upper clamp 10.

Those skilled in the art can readily appreciate that the double-arm lever 13 of the present invention works as a third class lever and as a first class lever. To work in this double way, the lever has two pivoting centers or fulcrums. One is the double lever connecting rod 40 where the cable 80 is attached, and the second one is the pivot pin 50 passing through the holes 14 on each central section 13 of the lever and through middle shank 23 of the lower hook 25.

When a fish bites the lure 65 a force is transmitted to the pivot pin 50 from the lower hook 25. This moves the upper clamp 10 towards the lure 65. Third class levers increase the speed with which a load can be moved. When the fisherman pulls the fishing line 80, a second force is transmitted to the pivot pin 40 which becomes a second fulcrum of the double-arm lever.

What is claimed is:

1. A pointless releasable fish hook comprising:
   a. a lower hook which is L-shaped, which at one proximate end has an opening where fishing line passing through and into which a locking plug can be engaged, said end extending to a center shaft having a pivot pin, and said shaft extending to a distal end of said lower hook where a lure can be attached; and
   b. a double lever comprising a pair of levers working in tandem, by the above-described pivot pin which acts as a fulcrum and said levers being also attached at one end of the levers by a double lever connecting rod; said levers at the other end having an upper clamp extending to connect the pair of levers together at the end opposite the connecting rod, thus allowing the levers and upper clamps to move as a single unit with the pivot pin as its axis;
   c. a locking plug which consists of a cylindrically shaped distal end tapering to a narrow constricted middle which extends onto a conical end; and at the tip of the conical end and at the tip of the cylindrical shaped distal end of the said plug there is attached fishing line, said fishing line which is attached to the conical end of the locking plug runs through the opening in the proximal end of the lower hook, the locking plug being engageable in the opening at the lower hook when the line is pulled, the fishing line being attached at the distal end of the locking plug and extends to the double lever connecting rod; and
   d. wherein said upper clamp having a base that is curved so as to allow a fish to be held while following the contour of the fish's anatomy, and said upper clamp being located at one end of the double levers so that the levers can move simultaneously; and
   e. wherein said pivot pin pivotally attaches the lower hook to the double lever and acts as a fulcrum around which the double lever rotates down upon the lower hook; and
   f. wherein said double lever connecting rod is a rod or pin onto which fishing line from the distal end of the locking plug attaches and which also serves to connect the double lever allowing it to move simultaneously as a unit with the upper clamp.

* * * * *